(12) United States Patent
Gottumukkula et al.

(10) Patent No.: US 8,031,703 B2
(45) Date of Patent: Oct. 4, 2011

(54) SYSTEM AND METHOD FOR DYNAMIC MAINTENANCE OF FABRIC SUBSETS IN A NETWORK

(75) Inventors: Aditya Gottumukkula, Andhra Pradesh (IN); Vishal P. Kadam, Karnataka (IN); Nivetha Balakrishnan, Karnataka (IN); Rohit G. Bhat, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 302 days.

(21) Appl. No.: 12/246,750

(22) Filed: Oct. 7, 2008

(65) Prior Publication Data
US 2010/0040053 A1 Feb. 18, 2010

(30) Foreign Application Priority Data
Aug. 14, 2008 (IN) .......................... 1940/DEL/2008

(51) Int. Cl.
*H04L 12/50* (2006.01)
*H04L 12/28* (2006.01)
*G06F 15/177* (2006.01)

(52) U.S. Cl. ........ 370/357; 370/254; 370/351; 370/389; 370/392; 370/400; 709/220; 709/221; 709/224

(58) Field of Classification Search .......... 370/228–503; 709/220–224
See application file for complete search history.

(56) References Cited

U.S. PATENT DOCUMENTS

| | | | |
|---|---|---|---|
| 5,778,234 A | | 7/1998 | Hecht et al. |
| 6,131,159 A | | 10/2000 | Hecht et al. |
| 6,460,113 B1 | | 10/2002 | Schubert et al. |
| 6,597,691 B1 | * | 7/2003 | Anderson et al. ............. 370/360 |
| 6,765,919 B1 | * | 7/2004 | Banks et al. .................. 370/401 |
| 6,920,491 B2 | * | 7/2005 | Kim ............................. 709/220 |
| 6,920,494 B2 | * | 7/2005 | Heitman et al. .............. 709/223 |
| 6,941,357 B2 | * | 9/2005 | Nguyen et al. ............... 709/220 |
| 6,980,525 B2 | * | 12/2005 | Banks et al. .................. 370/254 |
| 6,996,638 B2 | * | 2/2006 | Brice et al. .................... 710/36 |
| 6,996,670 B2 | * | 2/2006 | Delaire et al. ................ 711/114 |
| 7,039,870 B2 | | 5/2006 | Takaoka et al. |
| 7,051,101 B1 | | 5/2006 | Dubrovsky et al. |
| 7,103,653 B2 | | 9/2006 | Iwatani |

(Continued)

OTHER PUBLICATIONS

Dell, Inc. "Chapter 15: Managing Fibre Channel Fabric Switch Zones." Dell PowerVault SAN Administrator's Guide. May 8, 2008. pp. 1-9. <http://support.dell.com/support/edocs/stor-sys/ssan/admin_gd/9343V150.pdf>.

(Continued)

*Primary Examiner* — Ayaz Sheikh
*Assistant Examiner* — Venkatesh Haliyur
(74) *Attorney, Agent, or Firm* — Larson Newman, LLP

(57) ABSTRACT

A networking device includes a port, and a management module that identifies fabric subsets that include networked devices that can exchange information with each other, detects that a networked device was uncoupled from the networking device, and modifies the fabric subsets. A Fibre Channel switch includes ports, zones and a management module. Each zone includes subsets of devices coupled to the ports, and permits the subset of devices to exchange information with each other. The management module detects when a device becomes uncoupled from a port and automatically updates the zones to restrict the device from exchanging information with other devices. A method includes identifying fabric subsets in a network, selecting a fabric subset that includes networked devices that are permitted to exchange information with each other, detecting that one of the networked devices has become uncoupled from the network, and automatically modifying a portion of the network fabric.

16 Claims, 4 Drawing Sheets

U.S. PATENT DOCUMENTS

| | | | |
|---|---|---|---|
| 7,103,711 B2 | 9/2006 | Valdevit | |
| 7,120,128 B2* | 10/2006 | Banks et al. | 370/254 |
| 7,124,249 B1* | 10/2006 | Darcy | 711/122 |
| 7,127,599 B2* | 10/2006 | Brice et al. | 713/1 |
| 7,130,938 B2* | 10/2006 | Brice et al. | 710/62 |
| 7,167,472 B2* | 1/2007 | Wu et al. | 370/389 |
| 7,171,474 B2* | 1/2007 | Shanthaveeraiah et al. | 709/227 |
| 7,194,538 B1* | 3/2007 | Rabe et al. | 709/224 |
| 7,248,580 B2 | 7/2007 | George et al. | |
| 7,283,486 B2* | 10/2007 | Banks et al. | 370/254 |
| 7,287,063 B2* | 10/2007 | Baldwin et al. | 709/216 |
| 7,290,070 B2* | 10/2007 | Brice et al. | 710/37 |
| 7,325,097 B1* | 1/2008 | Darcy | 711/117 |
| 7,328,260 B1* | 2/2008 | Muthiyan et al. | 709/224 |
| 7,352,740 B2 | 4/2008 | Hammons et al. | |
| 7,366,194 B2 | 4/2008 | Yu et al. | |
| 7,397,768 B1* | 7/2008 | Betker | 370/254 |
| 7,401,338 B1* | 7/2008 | Bowen et al. | 719/328 |
| 7,403,987 B1* | 7/2008 | Marinelli et al. | 709/223 |
| 7,437,753 B2* | 10/2008 | Nahum | 726/4 |
| 7,466,712 B2* | 12/2008 | Makishima et al. | 370/401 |
| 7,484,021 B2* | 1/2009 | Rastogi et al. | 710/74 |
| 7,506,039 B2* | 3/2009 | Hammons et al. | 709/223 |
| 7,506,040 B1* | 3/2009 | Rabe et al. | 709/223 |
| 7,620,323 B2* | 11/2009 | Strasser et al. | 398/50 |
| 7,685,261 B1* | 3/2010 | Marinelli et al. | 709/220 |
| 7,685,281 B1* | 3/2010 | Saraiya et al. | 709/226 |
| 7,742,484 B2* | 6/2010 | Makishima et al. | 370/400 |
| 7,886,031 B1* | 2/2011 | Taylor et al. | 709/221 |
| 7,936,769 B2* | 5/2011 | Chung et al. | 370/401 |
| 2002/0145779 A1* | 10/2002 | Strasser et al. | 359/124 |
| 2002/0194407 A1* | 12/2002 | Kim | 710/104 |
| 2004/0028038 A1* | 2/2004 | Anderson et al. | 370/386 |
| 2004/0085908 A1* | 5/2004 | Balasubramanian et al. | 370/252 |
| 2004/0088396 A1* | 5/2004 | Hammons et al. | 709/223 |
| 2005/0060598 A1* | 3/2005 | Klotz et al. | 714/4 |
| 2006/0023726 A1* | 2/2006 | Chung et al. | 370/398 |
| 2007/0220124 A1 | 9/2007 | Golasky | |
| 2007/0266132 A1* | 11/2007 | Hariharan et al. | 709/223 |
| 2007/0291785 A1 | 12/2007 | Sharma et al. | |

OTHER PUBLICATIONS

Dell Computer Corporation. "Chapter 1: Introduction." Dell PowerVault 5xF Switches Zoning Guide. May 2000. pp. 1-3. <http://support.dell.com/support/edocs/stor-sys/sswitch/en/sw51f/4052u.pdf>.

Dell Computer Corporation. "Chapter 2: Zones, Components, and Configurations." Dell PowerVault 5xF Switches Zoning Guide. May 2000. pp. 1-4. <http://support.dell.com/support/edocs/stor-sys/sswitch/en/sw51f/4052u.pdf>.

Dell Computer Corporation. "Chapter 3: Using Zoning." Dell PowerVault 5xF Switches Zoning Guide. May 2000. pp. 1-6. <http://support.dell.com/support/edocs/stor-sys/sswitch/en/sw51f/4052u.pdf>.

* cited by examiner

FIG. 6

604
| ZONE | ELEMENTS |
|---|---|
| A' | x0001, Port 213 |
| B | x0004, x0005 |
| C | x0001, Port 216 |
| D' | x0003 |
| E | x0004, x0005, Port 216 |

606
| CONFIG | ZONES |
|---|---|
| I | A, B |
| II | B, C, D |
| III | A, E |

FIG. 7

704
| ZONE | ELEMENTS |
|---|---|
| A' | x0001, Port 213 |
| B | x0004, x0005 |
| C | x0001, Port 216 |
| X | |
| E | x0004, x0005, Port 216 |

706
| CONFIG | ZONES |
|---|---|
| I | A, B |
| II' | B, C |
| III | A, E |

FIG. 8

704
| ZONE | ELEMENTS |
|---|---|
| A' | x0001, Port 213 |
| B | x0004, x0005 |
| C | x0001, Port 216 |
| X | |
| E | x0004, x0005, Port 216 |

806
| CONFIG | ZONES |
|---|---|
| I | A', B |
| II | B, C, D' |
| III | A', E |
| IV | B, C |

FIG. 9

704
| ZONE | ELEMENTS |
|---|---|
| A' | x0001, Port 213 |
| B | x0004, x0005 |
| C | x0001, Port 216 |
| X | |
| E | x0004, x0005, Port 216 |

906
| CONFIG | ZONES |
|---|---|
| I | A', B |
| II | |
| III | A', E |
| IV | B, C |

FIG. 10

1104
| ZONE | ELEMENTS |
|---|---|
| A | x0001, x0002, Port 213 |
| B | x0004, x0005 |
| C | x0001, Port 216 |
| D | Port 212, x0003 |
| E | x0004, x0005, Port 216 |
| F | X0001, Port 213 |
| G | x0003 |

1106
| CONFIG | ZONES |
|---|---|
| I | A, B |
| II | B, C, D |
| III | A, E |
| IV | F, B |
| V | B, C, G |
| VI | F, E |

FIG. 11

1104
| ZONE | ELEMENTS |
|---|---|
| X | |
| B | x0004, x0005 |
| C | x0001, Port 216 |
| X | |
| E | x0004, x0005, Port 216 |
| F | X0001, Port 213 |
| G | x0003 |

1106
| CONFIG | ZONES |
|---|---|
| X | |
| X | |
| X | |
| IV | F, B |
| V | B, C, G |
| VI | F, E |

SYSTEM AND METHOD FOR DYNAMIC MAINTENANCE OF FABRIC SUBSETS IN A NETWORK

CROSS REFERENCE TO RELATED APPLICATIONS

This application claims priority under 35 U.S.C. §119 to Indian Patent Application No. 1940/DEL/2008, entitled "SYSTEM AND METHOD FOR DYNAMIC MAINTENANCE OF FABRIC SUBSETS IN A NETWORK," filed on Aug. 14, 2008.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems.

Information handling systems are often coupled together into networks or clusters in order to share resources or perform large processing tasks efficiently. Networks of information handling systems are typically created by coupling the individual information handling systems to an external networking device. The networking device functions to receive communications from the information handling systems, determine the target of the communications, and forward the communications to the target information handling system. A network fabric, or switch fabric, includes the hardware, software, firmware, middleware, etc. used to exchange communications between the individual information handling systems. The switch fabric can be organized into fabric subsets whereby the information handling systems that belong to a particular fabric subset can exchange information with each other, while information handling systems that do not belong to the particular fabric subset cannot exchange information with the information handling systems that belong to the particular fabric subset. When the network topography changes, as when an information handling system is removed from the network, the fabric subsets need to be modified to prevent security gaps.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 6 illustrates an embodiment wherein a management module deletes removed devices in the zone table and leaves the configuration table unchanged;

FIG. 7 illustrates an embodiment wherein a management module deletes removed devices in the zone table, deletes zones with only one device, and modifies the configuration table to exclude the deleted zones;

FIG. 8 illustrates an embodiment wherein a management module deletes removed devices in the zone table, deletes zones with only one device, leaves the existing configurations unchanged, and adds a new configuration to the configuration table;

FIG. 9 illustrates an embodiment wherein a management module deletes removed devices in the zone table, deletes zones with only one device, and deletes unused configurations;

FIG. 10 illustrates an embodiment wherein a management module leaves existing zones and configurations unchanged, and adds new zones and configurations;

FIG. 11 illustrates an embodiment wherein a management module adds new zones and new configurations, and deletes unused zones and unused configurations;

The use of the same reference symbols in different drawings indicates similar or identical items.

DETAILED DESCRIPTION OF DRAWINGS

Figure 1:
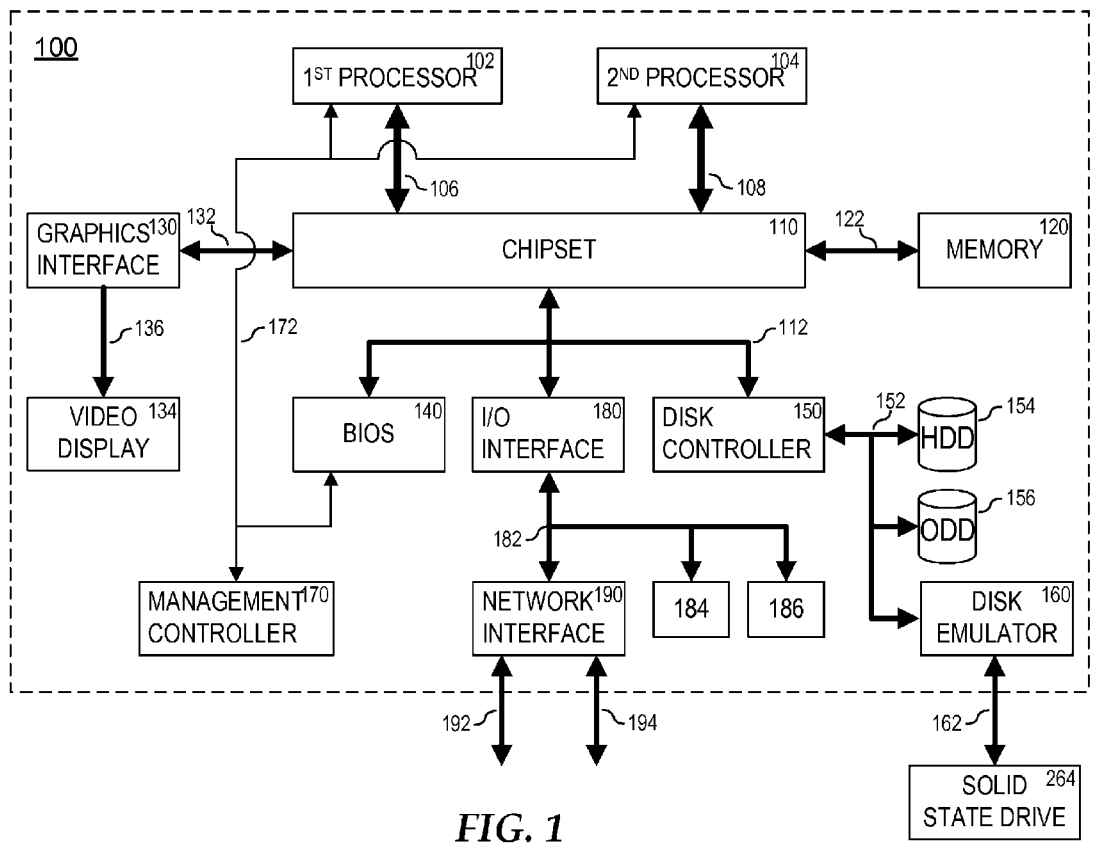
FIG. 1 illustrates a functional block diagram of an exemplary embodiment of an information handling system.

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, a wireless router, or another network communication device, or any other suitable device, and can vary in size, shape, performance, functionality, and price. An information handling system can also include a set of any of the foregoing devices.

The information handling system can include memory (volatile (e.g. random access memory (RAM), etc.), nonvolatile (read only memory (ROM), flash memory, etc.), or any combination thereof), one or more processing resources, such as a central processing unit (CPU), hardware, firmware, or software control logic, or any combination thereof. Additional resources of the information handling system can include one or more storage devices, one or more communications ports for communicating with external devices, as well as various input and output (I/O) devices, such as a keyboard, a mouse, a video display, or any combination thereof. The information handling system can also include one or more buses operable to transmit communications between the various hardware resources. Portions of an information handling system may themselves be considered information handling systems.

Portions of an information handling system, when referred to as a "device", a "module", or the like, may be configured as hardware, firmware, software, or any combination thereof. For example, a device or a module may be hardware. A non-limiting example of a device or a module implemented as hardware includes: an integrated circuit (e.g., an Application Specific Integrated Circuit (ASIC), a Field Programmable Gate Array (FPGA), a structured ASIC, or a device embedded on a larger chip), a card (e.g., a Peripheral Component Interface (PCI) card, a PCI-express card, a Personal Computer Memory Card International Association (PCMCIA) card, or other such expansion card), or a system (e.g., a motherboard, a system-on-a-chip (SoC), or a stand-alone device). Similarly, the device or module can be firmware (i.e., any software running on an embedded device, a Pentium class or PowerPC™ brand processor, or other such device) or software (i.e., any software capable of operating in the relevant environment). The device or module can also be a combination of any of the foregoing examples of hardware, firmware, or software. Note that an information handling system can include an integrated circuit or a board-level product having portions thereof that can also be any combination of hardware or software.

Devices or programs that are in communication with one another need not be in continuous communication with each other, unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. A network element may be networked device, a networking device, a node, a piece of hardware, software, firmware, middleware, another component of a computing system, or any combination thereof. In this context, a communicative interaction may be intending to send information, sending information, requesting information, receiving information, receiving a request for information, or any combination thereof. As such, a communicative interaction could be unidirectional, bi-directional, multi-directional, or any combination thereof. In some circumstances, a communicative interaction could be relatively complex and involve two or more network elements. For example, a communicative interaction may be "a conversation," or series of related communications between a client and a server—each network element sending and receiving information to and from the other. Whatever form the communicative interaction takes, the network elements involved need not take any specific form.

A communicative interaction can include management information and content information. As used herein, the term "management information" with respect to a communicative interaction, is intended to mean information used to direct, manage, or other wise control a network. As such, management information can be used by the network elements to identify the particular network elements that are coupled to the network, set-up and initialize the network elements, control routing of communicative interactions, perform another suitable function, or any combination thereof. A non-limiting example of management information includes a router set-up command, data packet header information (e.g., addresses), an Internet Control Message Protocol (ICMP) message (e.g., echo request, router discovery, timestamp, etc.), other suitable management information, or any combination thereof.

The term "content information" with respect to a communicative interaction, is intended to mean information that is not management information. Thus, content information can include information that is targeted to one or more network element, is received by the targeted elements to be processed or manipulated, displayed, stored, forwarded to another network element, perform another suitable function, or any combination thereof. A non-limiting example of content information includes most data packet payload information, a media file (e.g., audio, video, or picture files, etc.), a textual file (e.g., e-mail, word processing files, etc.), a program, a data file (e.g., spreadsheet or database file, etc.), another suitable form of content information, or any combination thereof.

In the description below, a flow-charted technique may be described in a series of sequential actions. The sequence of the actions, and the party performing the steps may be freely changed without departing from the scope of the teachings. Actions may be added, deleted, or altered in several ways. Similarly, the actions may be re-ordered or looped. Further, although processes, methods, algorithms, or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features, but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and resources described herein. This is done merely for convenience, and to give a general sense of the scope of the invention. This description should be read to include one, or at least one, and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only, and not intended to be limiting.

To the extent not described herein, many details regarding specific materials, processing acts, and circuits are conventional, and may be found in textbooks and other sources within the computing, electronics, and software arts.

An information handling system, and method of using it are described below. An exemplary, non-limiting system description is described before addressing methods of using it. Some of the functionality of modules within the system is described with the system. The utility of the system and its modules will become more apparent with the description of the methods that follow the description of the system and modules.

Two or more devices, such as information handling systems, can be coupled together in a network such that individual devices in the network, referred to as networked devices, can exchange information with each other over a network fabric. A non-limiting example of a network includes a local area network (LAN), a metropolitan area network (MAN), a storage area network (SAN), a wide area network (WAN), a wireless local area network (WLAN), a virtual private network (VPN), an intranet, the Internet, any other appropriate network architecture or system, or any combination thereof. The networked devices on a network can include storage devices, disk arrays, file servers, print servers, modems, hubs, other devices capable of being coupled to a network, or any combination thereof.

The network fabric includes the hardware, software, firmware, middleware, etc. used to exchange the information between the individual information handling systems. In a non-limiting embodiment, the network exchanges information using a Fibre Channel (FC) fabric, a Frame Relay fabric, an Asynchronous Transfer Mode (ATM) fabric, an Internet protocol (IP) or other packet-based protocol, another fabric protocol or fabric standard, or any combination thereof. An information handling system incorporates parts of the network fabric, including a network interface and network channels. The network fabric typically also includes one or more networking devices that manage the exchange of information between the networked devices of the network. A networking device can include two or more ports, each operable to couple the networking device to a networked device (e.g., an information handling system) or another networking device. A networking device can be an information handling system, and can include a processor and a memory. A non-limiting example of a networking device includes a hub, a router, a switch, another device for managing the exchange of information between networked devices of the network and other network devices, or any combination thereof.

The network stores and maintains management information used by a management module to configure and operate the network. The management information may be stored and maintained on a particular networking device, on one of the networked devices of the network, or on any combination thereof. The management information can include grouping information that establishes barriers, or fabric subsets, between various groupings of networked devices on the network. For example, a particular fabric subset may permit a particular networked device to exchange information with a particular networked device, but not with another networked device. The management module can include a processing and storage capability (e.g., an information handling system) used to create, maintain, update, change or delete management information, including the fabric subsets. The management module can be implemented on the networking device, on one of the networked devices of the network, or on any combination thereof.

In an embodiment, a Fibre Channel fabric network can include fabric subsets called zones. The networked devices in a zone are referred to as elements. The elements in a zone can be mapped to the zone by the physical port to which the element is coupled or by a unique identification number. A non-limiting example of a unique identifier includes a World Wide Name (WWN), an Internet Protocol (IP) address, a medium access control (MAC) address, another suitable hardware or software address, or any combination thereof. When an element of a zone is identified by the physical port number, any networked device coupled to that port becomes a part of the zone, regardless of the unique identifier of the networked device. When an element of a zone is identified by a networked device's unique identifier, then the networked device with the specified unique identifier becomes a part of the zone, regardless of which physical port is coupled to the networked device.

All of the zones on a network do not necessarily operate at the same time. The set of defined zones can substantially include all of the zones on a network. A zone configuration is a set of defined zones within a network. Multiple zone configurations may be created within the network, but only one zone configuration may be operating at a time. Thus the zoning behavior within the network may be changed by selecting different zone configurations. The zones that make up the operating zone configuration at a given time are referred to herein as the effective zones. The management program can create and maintain the defined zones and the zone configurations, and can select which zone configuration is operating.

FIG. 1 illustrates a functional block diagram of an exemplary embodiment of an information handling system, generally designated as 100. The information handling system 100 can include a processor 102 coupled to a host bus 106, and can further include one or more additional processors, generally designated as an $n^{th}$ processor 104, coupled to a host bus 108. The processor 102 can be coupled to a chipset 110 via the host bus 106 and the $n^{th}$ processor 104 can be coupled to the chipset 110 via the host bus 108. The chipset 110 can support the processors 102 through 104, allowing for simultaneous processing by the processors 102 through 104, and can support the exchange of information within the information handling system 100 during multiple processing operations. In an aspect, the chipset 110 can function to provide access to the processor 102 using host bus 106, and the $n^{th}$ processor 104 using the host bus 108. In another aspect, the chipset 110 can include a dedicated bus (not illustrated) to transfer data between the processor 102 and the $n^{th}$ processor 104.

The information handling system 100 can include a memory 120 coupled to a memory bus 122. In accordance with an aspect, the chipset 110 can be referred to as a memory hub or a memory controller, where the memory 120 can be coupled to the chipset 110 via the memory bus 122. For example, the chipset 110 can include an Accelerated Hub Architecture (AHA) enabled-chipset that can include a memory controller hub and an I/O controller hub. As a memory controller hub, the chipset 110 can be coupled to the host buses 106 through 108, and the memory bus 122 as individual buses, or as part of the same bus (not illustrated). The chipset 110 can also provide bus control and can handle transfers between the host buses 106 through 108, and the memory bus 122. In accordance with another aspect (not illustrated), the information handling system can include a separate memory dedicated to each processor 102 through 104. Each memory can include a memory bus coupled between each processor 102 through 104 and its dedicated memory. In accordance with yet another aspect, the chipset 110 can be generally considered an application specific chipset that provides connectivity to various buses, and integrates other system functions. For example, the chipset 110 can be provided using a chipset that includes two parts: a Graphics and Memory Controller Hub (GMCH) and an I/O Controller Hub (ICH). The chipset 110 can also be packaged as an ASIC.

The information handling system 100 can also include a graphics interface 130 that can be coupled to the chipset 110 using the graphics bus 132. The graphics interface 130 can provide a video display output 136 to the video display 134. In one form, the graphics interface 130 can be an Accelerated Graphics Port (AGP) interface to display content within a video display 134. Other graphics interfaces (not illustrated) may also be used in addition to the graphics interface 130 if needed or desired. The video display 134 can include one or more types of video displays, such as a flat panel display or other type of display device.

The information handling system 100 can also include an I/O channel 112 connected to the chipset 110. The I/O channel 112 can include a Peripheral Component Interconnect (PCI) bus, a PCI-Extended (PCI-X) bus, a high-speed link of PCI-Express (PCIe) lanes, another industry standard or proprietary bus or link, or any combination thereof. In one embodiment, a PCI bus can be operated at approximately 66 MHz, a PCI-X bus can be operated at approximately 133 MHz, and a PCIe link can be operated at approximately 250 million bytes per second (MB/s) per lane in each direction. PCI buses, PCI-X buses, and PCIe links can be provided to comply with industry standards for connecting and communicating between various PCI, PCI-X and PCIe enabled hardware devices, respectively. The chipset 110 can include other buses in association with, or independent of, the I/O channel 112, including other industry standard buses (e.g., Industry Standard Architecture (ISA), Small Computer Serial Interface (SCSI), Inter-Integrated Circuit (I²C), System Packet Interface (SPI), or Universal Serial Bus (USB), proprietary buses or any combination thereof.

In an alternate embodiment, the chipset 110 can be a chipset employing a Northbridge/Southbridge chipset configuration (not illustrated). For example, a Northbridge portion of the chipset 110 can communicate with the processors 102 through 104 using the host buses 106 through 108, and can control interaction with the memory 120, the I/O channel 112, and activities for the video graphics interface 130. The chipset 110 can also include a Southbridge portion (not illustrated) of the chipset 110, and can handle I/O functions of the chipset 110. The Southbridge portion can manage basic forms of I/O, such as USB, serial I/O, audio outputs, Integrated Drive Electronics (IDE), ISA I/O, or any combination thereof for the information handling system 100.

The information handling system 100 can also include a basic input/output system (BIOS) module 140 that can be coupled to the I/O channel 112. The BIOS module 140 can include BIOS code operable to detect and identify resources within the information handling system 100, provide the appropriate drivers for those resources, initialize those resources, and access those resources.

The information handling system 100 can further include a disk controller 150 coupled to the I/O channel 112. The disk controller 150 can include a disk interface 152 that can include other industry standard buses (e.g., Integrated Drive Electronics (IDE), Parallel Advanced Technology Attachment (PATA), Serial Advanced Technology Attachment (SATA), SCSI, or USB or proprietary buses, or any combination thereof. The disk controller 150 can be coupled to one or more disk drives via the disk interface 152. Such disk drives include a hard disk drive (HDD) 154 or an optical disk drive (ODD) 156 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. The optical disk drive 166 can read a removable data storage medium (e.g., a Compact Disk (CD), a Digital Video Disk (DVD), a mini Digital Video Disk (mini-DVD), or other optical media). Additionally, the information handling system 100 can include a disk emulator 160 that is coupled to the disk interface 152. The disk emulator 160 can permit a solid-state drive 164 to be coupled to the information handling system 100 via an external interface 162. The external interface 162 can include other industry standard busses (e.g., USB or IEEE 1394 (Firewire)) or proprietary busses, or any combination thereof. Alternatively, the solid-state drive 164 can be disposed within the information handling system 100.

The information handling system 100 can further include a management controller 170 that can be coupled to the chipset 110 via a system communication bus 172, such as a control bus. The management controller 170 may be on a main circuit board (e.g., a baseboard, a motherboard, or any combination thereof), integrated onto another component such as the chipset 110, in another suitable location, or any combination thereof. Although not illustrated, another resource, such as the processors 102 or 104, the memory 120, the graphics interface 130, the video display 134, the I/O interface 140, or the disk controller 150, or any combination thereof, can be coupled to the management controller 170. Commands, communications, or other signals may be sent to or received from the management controller 170 by any one or any combination of resources previously described. The management controller 170 can be part of an integrated circuit or a chip set within the information handling system 100.

The information handling system 100 can also include an I/O interface 180 that can be connected to the chipset 110 via the I/O channel 112. The I/O interface 180 can be coupled to a peripheral channel 182 that can be of the same industry standard or proprietary bus or link architecture as the I/O channel 112, or of a different industry standard or proprietary bus or link architecture than the I/O channel 112. As such, the I/O interface 180 can extend the I/O channel 112 capacity when the peripheral channel 182 is the same as the I/O channel 112, or translate information from a type suitable to the industry standard or proprietary bus or link architecture of the I/O channel 112 to a type suitable to a different industry standard or proprietary bus or link architecture, and vise versa, when the peripheral channel 182 is different than the I/O channel 182. Other I/O interfaces (not illustrated) may also be used in addition to the I/O interface 180, if needed or desired.

The peripheral channel 182 can include a bus structure that allows the installation and coupling of additional resources 184 through 186 to the information handling system. In accordance with an aspect (not illustrated), the peripheral channel 182 can also include one or more point-to-point links to the additional resources 184 through 186. The external resources 184 through 186 can include a data storage system, a graphics interface, another suitable resource or any combination thereof. The additional resources 184 through 186 can be on a main circuit board, on separate circuit boards or add-in cards disposed within the information handling system 100, devices that are external to the information handling system 100, or any combination thereof.

The information handling system 100 can also include a network interface device 190 that is coupled to the I/O interface 180 via the peripheral channel 182. The network interface device 190 may be a network interface card (NIC) disposed within the information handling system 100, on a main circuit board (e.g., a baseboard, a motherboard, or any combination thereof), integrated onto another component such as the chipset 110, in another suitable location, or any combination thereof. The network interface device 190 can include a network channel 192 and a network channel 194. The network interface device 190 can also include additional network channels (not illustrated). In accordance with an aspect, the network channel 192 is of a different industry standard or proprietary bus or link architecture than the peripheral channel 182, and the network interface device 190 can translate information from a type suitable to the industry standard or proprietary bus or link architecture of the peripheral channel 182 to a type suitable to the industry standard or proprietary bus or link architecture of the network channel 192, and vice versa. Likewise, the network channel 194 is of a different industry standard or proprietary bus or link architecture than the peripheral channel 182. The network channels 192 and 194 can be of industry standard architecture (e.g., InfiniBand, Fibre Channel, Gb Ethernet, etc.), proprietary channel architecture, or any combination thereof. Other network interface devices (not illustrated) may also be used in addition to the network interface device 190, if needed or desired. The network channels 192 and 194 can be coupled to a networked device, (not illustrated), a networking device (not illustrated), or any combination thereof. Such devices can include another information handling system, a data storage system, disk drive, another network, a grid management system, another suitable resource or any combination thereof. Such devices can also have a network interface that performs a function similar to the network interface 190. Other components within such devices can be similar to or different from the components in the information handling system 100.

Figure 2:
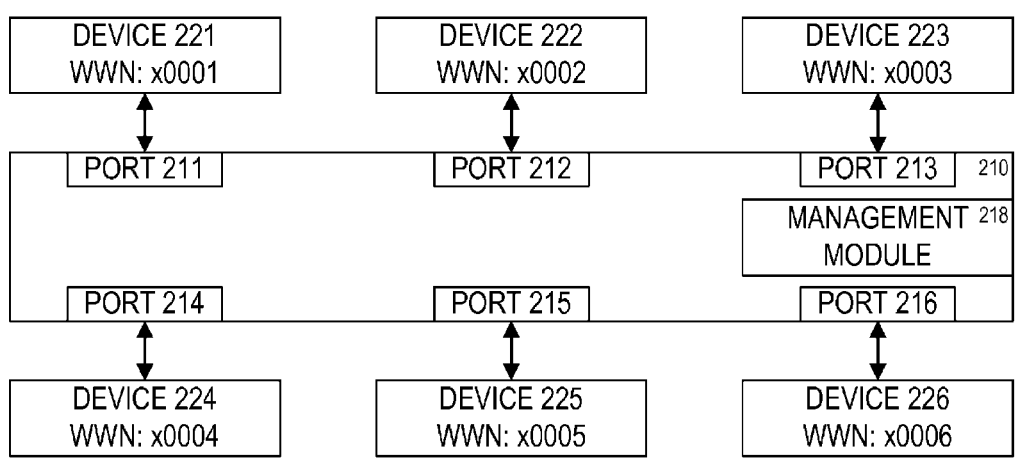
FIG. 2 illustrates an embodiment of a Fibre Channel network.

FIG. 2 illustrates an embodiment of a Fibre Channel network, generally designated as 200. The network 200 includes a networking device, referred to hereinafter as a switch 210, with six ports 211, 212, 213, 214, 215, and 216, and a management module 218. The network 200 also includes six networked devices, referred to hereinafter as devices 221, 222, 223, 224, 225, and 226. Each device 221 through 226 is coupled to one of the six ports 211 through 216. As such, device 221 is coupled to port 211, device 222 is coupled to port 212, device 223 is coupled to port 213, device 224 is coupled to port 214, device 225 is coupled to port 215, and device 226 is coupled to port 216.

Figures 3, 4, 5:
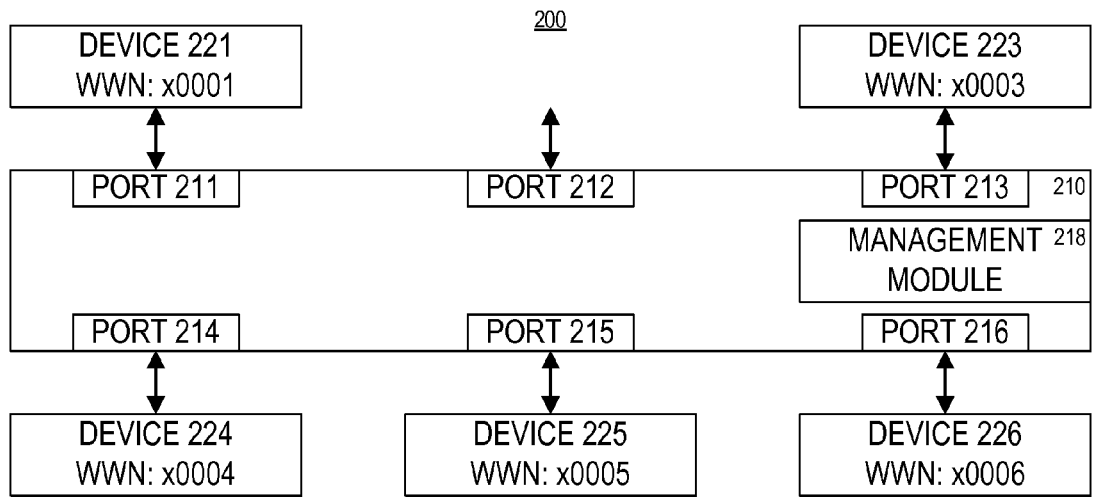
FIG. 3 illustrates management information stored on a management module, including a device table, a zone table, and a configuration table.
FIG. 4 illustrates the network of FIG. 2 with a device uncoupled and removed from the network.
FIG. 5 illustrates a device table that has been modified by a management module.

FIG. 3 illustrates an exemplary embodiment of management information 300 stored on the management module 218. The management module 218 can create, maintain, update, change or delete the management information 300 as conditions change on the network. The management module 218 can function automatically, at the direction of a network operator, or both. The management information includes a device table 302, a defined zone table 304, and a zone configuration table 306. The device table 302 includes information regarding the network topography, with an entry for each port (e.g., port 211 through 216), and the device 221 through 226 coupled to each port 211 through 216. The device table 302 also includes a World Wide Name and a device type for each device 221 through 226. Here, device 221 has WWN: x0001 and is an NT data server, device 222 has WWN:x0002 and is an NT application server, device 223 has WWN:x0003 and is a router to a LAN of NT clients, device 224 has WWN:x0004 and is a Novell application and data server, device 225 has WWN:x0005 and is a Novell application and data server, and device 226 has WWN:x0006 and is a tape back-up.

The defined zone table 304 illustrates the defined zones A, B, C, D, and E. Zone A includes the elements: WWN:x0001 (device 221), WWN:x0002 (device 222), and the device coupled to Port 213 (device 223). Zone B includes elements: WWN:x0004 (device 224) and WWN:x0005 (device 225). Zone C includes the elements: WWN:x0001 (device 221), and the device coupled to Port 216 (device 226). Zone D includes the elements: the device coupled to Port 212 (device 222), and WWN:x0003 (device 223). Finally, zone E includes the elements: WWN:x0004 (device 224), WWN:x0005 (device 225), and the device coupled to Port 216 (device 226). Here, zone A permits the NT data server (device 221), the NT application server (device 222), and the router to the LAN (device 223) to exchange information. Zone B permits the Novell application and data servers (devices 224 and 225) to exchange information. Zone C permits the NT data server (device 221) and the tape back-up (device 226) to exchange information. Zone D permits the NT application server (device 222) and the router to the LAN (device 223) to exchange information. Zone E permits the Novell application and data servers (devices 224 and 225) and the tape back-up (device 226) to exchange information.

The zone configuration table 306 illustrates the zone configurations I, II, and III. Configuration I includes zones A and B, configuration II includes zones B, C, and D, and configuration III includes zones A and E. Configuration I can be associated with day-to-day operations on the network, permitting the NT devices 221, 222, and 223 to exchange information (e.g., zone A), and the Novell devices 224 and 225 to exchange information (e.g., zone B). Configuration II can be associated with an NT data back-up operation, permitting the Novell devices 224 and 225 to exchange information (e.g., zone B), the NT data server device 221 to exchange information with the tape back-up device 226 (e.g., zone C), and the LAN device 223 to exchange information with the NT application server device 222 (e.g., zone D). Configuration III can be associated with a Novell data back-up operation, permitting the NT devices 221, 222, and 223 to exchange information (e.g., zone A), and the Novell devices 224 and 225 to exchange information with the tape back-up device 226 (e.g., zone E).

In operation, network topography can change, and networked devices associated with the fabric subsets can be added to, or removed from the network. When a particular networked device is removed from the network for a short time, no changes to the associated fabric subsets may be needed or desired. For example, when a particular physical port is associated with a data storage server on a particular fabric subset, the network operator may desire to install an upgraded data storage server by simply coupling it to the same physical port. Also, when a particular networked device is associated with a fabric subset by the networked device's unique identifier, the network operator may desire to reorganize cable routings, and couple the networked device to a different port, while maintaining the associated fabric subset.

On the other hand, when a particular networked device is removed from the network for a longer period of time, the associated fabric subsets may be changed to reduce security gaps. For example, where the removed networked device was identified as a member of a particular fabric subset by the physical port number, if the physical port is not deleted from the particular fabric subset, then any networked device that is subsequently coupled to physical port will obtain access to all of the other networked devices in the particular fabric subset. On the other hand, where the removed networked device was identified as a member of a particular fabric subset by the networked device's unique identifier, and the removed networked device is reconfigured to perform a different task, when the networked device is re-coupled to the network, the networked device will retain access to all of the other networked devices in the particular fabric subset.

When a networked device is removed from a network for a predetermined time, or longer, the management module on the network can automatically detect the removal and make appropriate changes to the management information. The management module can detect that a networked device has been removed from the network by detecting the physical act of decoupling the networked device from the networking device (e.g., a network cable coupling the networked device to the port of the networking device is disconnected), by detecting that a networked device has not been logged on to the network for a predetermined time, by another detection means, or any combination thereof. The management module can include a network operator defined threshold setting that establishes a time limit after which the modification of the management information occurs. For example, the network operator can decide that any changes made on the same day are temporary, and should not cause changes to the fabric subsets, but that changes that remove a networked device for more than one day are likely to be permanent or semi-permanent and that such changes should be reflected in changes to the fabric subsets. In a particular embodiment, the threshold setting should be one day. On the other hand, where the network operator knows that a particular back-up server is only logged onto the network once a week, the threshold setting can be significantly longer, such as one or two weeks.

In an embodiment of the present disclosure, when the topography of a network changes, the management module automatically detects the change and modifies the fabric subsets defined on the network to accurately reflect the change. In a particular embodiment, when a networked device is removed from a network, the management module detects that the networked device has been removed, and modifies the fabric subsets to account for the fact that a networked device was removed from the network.

FIG. 4 illustrates the network 200 with the device 222 (the NT application server) uncoupled from the port 212 and removed from the network 200. The management module 218 automatically detects the uncoupling and removal of the device 222 from the port 212 and modifies the management information 300 to reflect the change to the network 200, as described below.

FIG. 5 illustrates a device table 502 after being modified by the management module 218. The device table 502 illustrates the removal of the device 222, the corresponding WWN (x0002), and device type (NT Application Server) from the port 212, while maintaining entries for the device, WWN and device type associated with the ports 211, and 213 through 216.

FIGS. 6 through 11 illustrate different embodiments regarding how the management module 218 can modify the zone table 304 and the configuration table 306. As described hereinafter, where the contents of a zone or a configuration is changed, the zone name or the configuration name is described and illustrated as "name-prime" (e.g., zone A', configuration II', etc.) Also, zones or configurations that remain defined but unused are illustrated with a cross-hatched field in the respective figures. Also, zones or configurations that are deleted from the respective table are illustrated by a darkened field in the respective figures.

FIG. 6 illustrates a particular embodiment wherein the management module 218 deletes a removed device from the zones that include the device in the zone table 604, and leaves the configurations in the configuration table 606 unchanged. As such, references to WWN:x0002 and the port 212 are deleted from the associated zones. The modified zone A' includes the elements x0001 and Port 213 (e.g., the element x0002 has been deleted), and the modified zone D' includes the element x0003 (e.g., Port 212 has been deleted). The configurations I, II and III in the configuration table 306 remain unchanged, permitting the day-to-day operation (configuration I), the NT back-up operation (configuration II), and the Novell back-up operation (configuration III) to proceed unchanged.

Some zoning implementations may not permit zones with only one device. FIGS. 7 through 9 illustrate embodiments where the management module 218 deletes removed devices from the zones that include the devices and further deletes zones with only one device. In the zone table 704, all references to WWN:x0002 and the port 212 are deleted from the associated zones. Thus, the modified zone A' includes the elements x0001 and Port 213. While a modified zone D' would include only the element x0003, such a zone is not be permitted in this particular example, and hence, the zone D is deleted.

FIG. 7 illustrates an embodiment where the management module 218 modifies the configurations in the configuration table 706 to exclude the deleted zones. Thus, the configurations I and III in the configuration table 706 remain unchanged, permitting the day-to-day operation (configuration I), and the Novell back-up operation (configuration III) to proceed unchanged. However, the modified configuration II' only includes zones B and C. Thus, in the NT back-up operation (configuration II'), the Novell application and data servers devices 224 and 225 are permitted to exchange information via zone B, and the NT data server device 221 and the tape back-up device 226 are permitted to exchange information via zone C. While the LAN device 223 remains coupled to the network 200, there remains no valid device with which to exchange information when the network is operating in configuration II'. Note that, in this embodiment, if configuration II is the effective configuration at the time that the device 222 is removed from the network, then the management module 218 updates the effective configuration such that configuration II' is the new effective configuration.

FIG. 8 illustrates a particular embodiment where the management module 218 leaves the existing configurations (e.g., configurations I, II, and III) unchanged, and adds a new configuration, configuration IV, to the configuration table 806. Configuration IV includes the zones B and C, and excludes the deleted zone D. While configuration II remains in the configuration table 806, it is disabled and the new configuration IV is enabled, permitting the Novell application and data servers devices 224 and 224 to exchange information within zone B, and the NT data server device 221 and the tape back-up device 226 to exchange information within zone C.

FIG. 9 illustrates a particular embodiment where the management module 218 deletes unused configurations (e.g., configuration II) from the configuration table 906. Note that, in these embodiments, if configuration II is the effective configuration at the time that the device 222 is removed from the network, then the management module 218 updates the effective configuration such that configuration IV is the new effective configuration.

FIGS. 10 and 11 illustrate embodiments where the management module 218 adds new zones to the zone table 1004 and adds new configurations to the configuration table 1006. Each new zone acts as a replacement for a defined zone that includes a reference (e.g., a WWN or a Port mapping) to the removed device, and each new zone includes the same elements as the defined zone, except that the new zone does not include the reference to the removed device. As such, the new zone F, being a replacement for zone A, includes the elements x0001 and Port 213, and the new zone G, being a replacement for zone D, includes the element x0003. Likewise, each new configuration acts as a replacement for a configuration that includes a reference to a replaced zone. Each new configuration includes the same zones as the existing configuration, except that the new configuration replaces the new zones for the replaced zones. Thus, the new zones F and G are substituted into the new configurations IV, V, and VI, in place of the unused zones A and D, such that configuration IV includes the zones F and B, configuration V includes the zones B, C, and G, and configuration VI includes the zones F and E. In the day-to-day operation, the configuration IV is used in the place of the unused configuration I. For the NT back-up operation, the configuration V replaces the unused configuration II. The Novell back-up operation uses the configuration VI instead of the unused configuration III. FIG. 11 illustrates an embodiment where the management module 218 deletes the replaced zones (e.g., zones A and D) from the zone table 1104, and deletes the replaced configurations (e.g., configurations I, II, and III) from the configuration table 1106. Note that, in these embodiments, for whichever configuration is the effective configuration at the time that the device 222 is removed from the network, the management module 218 updates the effective configuration such that the associated replacement configuration is the new effective configuration.

Figure 12:
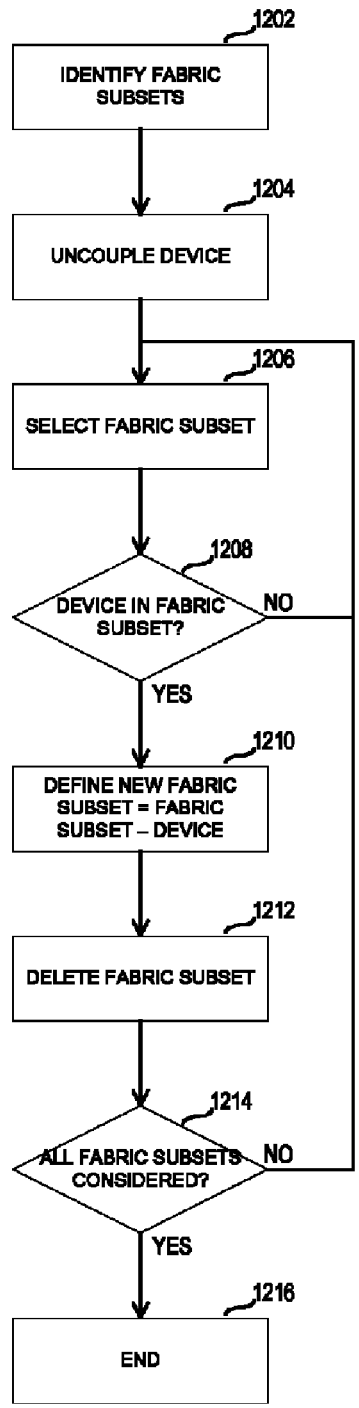
FIG. 12 illustrates an embodiment of a method of modifying fabric subsets within management information in a network in a flow chart form.

FIG. 12 illustrates an embodiment of a method of modifying fabric subsets within management information in a network 200 in a flow chart form. The fabric subsets in the network 200 are identified in block 1202. A particular device can become uncoupled from the network 200 in block 1204. When the management module 218 determines that the particular device has become uncoupled from the network, the management controller 218 selects a particular fabric subset in block 1206. The management module 218 determines if the uncoupled device is an element of the particular fabric subset in decision tree 1208. If not, then the management module 218 selects a next particular fabric subset in block 1206. If so, then the management module 218 creates a new fabric subset that is a copy of the particular fabric subset, but without any reference to the device in block 1210. The management controller 218 then deletes the particular fabric subset from the identified fabric subsets in block 1212. The management controller 218 determines if all fabric subsets have been examined in decision tree 1214. If not, then a next particular fabric subset is selected in block 1206. If so, then processing ends in block 1216.

Figure 13:
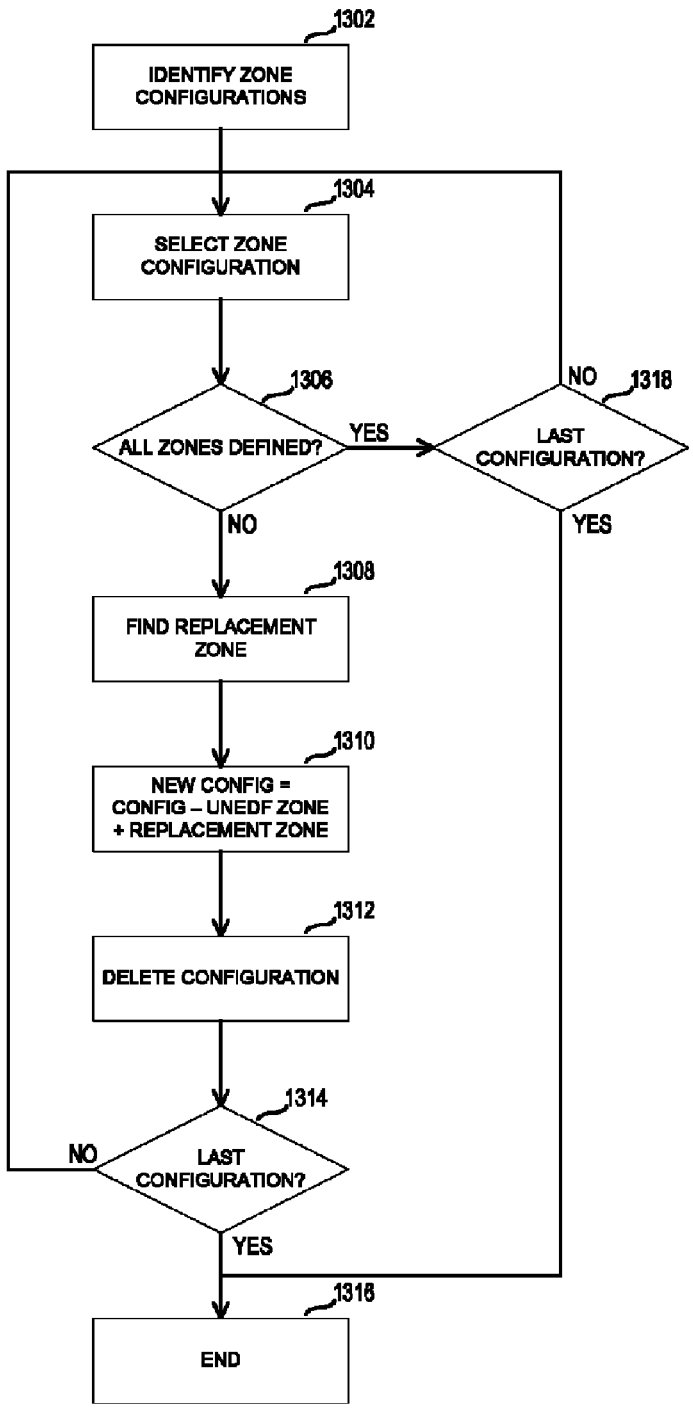
FIG. 13 illustrates an embodiment of a method of modifying zone configurations in a Fibre Channel network in a flow chart form.

FIG. 13 illustrates an embodiment of a method of modifying zone configurations in a Fibre Channel network in a flow chart form. The zone configurations in the configuration table 206 are identified in block 1302. The management module 218 selects a particular zone configuration in block 1304. The management module 218 determines if all the zones in the particular zone configuration are defined in the zone table 204 in decision tree 1306. If so, the management module 218 determines if the particular zone configuration is the last zone configuration in the configuration table 206 in decision tree 1318. If not, then the management module 218 selects the next zone configuration in block 1304. If not all the zones in the particular zone configuration are defined zones in the zone table 204, as determined in decision tree 1306, then the management module 218 fides a replacement zone in the zone table 204 for each non-defined zone in the zone table 204 in block 1308. The management module 218 creates a copy of the particular configuration in the configuration table 206, but with the non-defined zones replaced with the associated replacement zones in block 1310. The management module 218 deletes the particular zone configuration from the configuration table 206 in block 1312. The management module 218 determines if the particular zone configuration is the last zone configuration in decision tree 13148. If not, then the next zone configuration is selected in block 1304. If so, then processing ends in block 1316.

The present disclosure reveals methods and devices that improve management and security in a network by automatically updating and changing management information to reflect changes in network topography when devices are removed from the network. In this way, a network operator can spend less time maintaining accurate management information in the network.

Many different aspects and embodiments of the present disclosure are possible. Some of those aspects and embodiments are described below. After reading this specification, skilled artisans will appreciate that those aspects and embodiments are only illustrative, and do not limit the scope of the present invention.

In a first aspect, a method includes identifying a plurality of fabric subsets within a network fabric, selecting a first fabric subset from among the plurality of fabric subsets, wherein the first fabric subset includes a first networked device coupled to the network, and a second networked device coupled to the network, and wherein the first networked device is permitted to exchange information with the second networked device, detecting that the first networked device has become uncoupled from the network, and in response to detecting that the first networked device has become uncoupled, automatically modifying a portion of the network fabric.

In an embodiment of the first aspect, modifying the portion of the network fabric includes modifying the first fabric subset such that the modified first fabric subset does not include the first networked device. In another embodiment of the first aspect, modifying the portion of the network fabric includes creating a second fabric subset that includes the second networked device. In a further embodiment, modifying the portion of the network fabric further includes deleting the first fabric subset from among the plurality of fabric subsets. In still another embodiment, detecting that the first networked device has become uncoupled from the network includes detecting that the first networked device has been physically disconnected from the network. In yet another embodiment, detecting that the first networked device has become uncoupled from the network includes detecting that the first networked device has not been logged onto the network for a particular amount of time. In another embodiment, the network is a Fibre Channel network, and the plurality of fabric subsets include a plurality of zones.

In a second aspect, a networking device includes a port operable to couple to a first networked device, and a management module operable to identify a plurality of fabric subsets within a network fabric, select a first fabric subset from among the plurality of fabric subsets, wherein the first fabric subset includes the first networked device coupled to the port, and a second networked device, and wherein the first networked device is permitted to exchange information with the second information system, detect that the first networked device has become uncoupled from the port, and modify a portion of the network fabric in response to detecting that the first networked device has become uncoupled.

In an embodiment of the second aspect, the management module is further operable to modify a portion of the network fabric such that the first fabric subset does not include the first networked device. In another embodiment, the management module is further operable to modify a portion of the network fabric such that a second fabric subset that includes the second networked device is created. In still another embodiment, the management module is further operable to modify a portion of the network fabric such that such that the first fabric subset from among the plurality of fabric subsets is deleted. In yet another embodiment, the management module is further operable to detect that the first networked device has become uncoupled from the port when first networked device has been physically disconnected from the port. In a further embodiment, the management module is further operable to detect that the first networked device has become uncoupled from the port when the first networked device has not been logged onto the network for a particular amount of time. In still another embodiment, the network is a Fibre Channel network, and the plurality of fabric subsets comprises a plurality of zones.

In a third aspect, a Fibre Channel switch includes a plurality of ports, a plurality of zones, each zone comprising a subset of a plurality of devices operably coupled to the plurality of ports, each zone being operable to permit the subset of the plurality of devices associated with each particular zone to exchange information and restrict remainder of the plurality of devices not associated with each particular zone from exchanging information with the subset of the plurality of devices associated each particular zone, and a management module operable to detect when a particular device that is operably coupled to a particular port becomes uncoupled from the particular port and automatically update the plurality of zones to restrict the particular device from exchanging information with other devices.

In an embodiment of the third aspect, the management module is further operable to automatically update the plurality of zones such that each of the plurality of zones that includes the particular device among the subset of the plurality of devices no longer includes the particular device. In another embodiment, the management module is further operable to automatically update the plurality of zones such that each particular zone with a subset of the plurality of devices that includes only one of the plurality of devices is deleted. In still another embodiment, the management module is further operable to automatically update the plurality of zones such that a copy of each of the plurality of zones that includes the particular device among the subset of the plurality of devices is made, except that the copy of each of the plurality of zones does not include the particular device. In yet another embodiment, the management module is further operable to automatically update the plurality of zones such that each of the plurality of zones that included the particular device is deleted. In a further embodiment, the management module is further operable to detect when the particular device becomes uncoupled from the particular port when the particular device has not been logged onto the Fibre Channel switch for a particular amount of time.

Note that not all of the activities described above in the general description or the examples are required, that a portion of a specific activity may not be required, and that one or more further activities may be performed, in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features described herein in the context of separate embodiments for the sake of clarity, may also be provided in combination in a single embodiment. Conversely, various features that are, for brevity, described in the context of a single embodiment, may also be provided separately, or in any sub-combination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur, or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
within a network fabric, identifying a plurality of fabric subsets, such that networked devices coupled to the network fabric that are included in a particular fabric subset of the plurality of fabric subsets are permitted to exchange information with each other;
identifying a plurality of fabric subset configurations, such that each particular fabric subset configuration includes one or more fabric subsets of the plurality of fabric subsets that are active when the particular fabric subset configuration is active; detecting that a first networked device has become uncoupled from the network fabric; and
in response to detecting that the first networked device has become uncoupled: automatically modifying the plurality of fabric subsets; and automatically modifying the plurality of fabric subset configurations
wherein:
a first fabric subset includes the first networked device; and
a first fabric subset configuration includes the first fabric subset:

17 modifying the plurality of fabric subsets comprises modifying the first fabric subset such that the modified first fabric subset does not include the first networked device; and modifying the plurality of fabric subset configurations comprises modifying the first fabric subset configuration such that the modified first fabric subset configuration does not include the first fabric subset.

2. The method of claim 1, wherein: the first fabric subset includes a second networked device; and modifying the plurality of fabric subsets comprises creating a second fabric subset that does not include the first networked device and that includes the second networked device.

3. The method of claim 2, wherein modifying the plurality of fabric subsets further comprises deleting the first fabric subset from among the plurality of fabric subsets.

4. The method of claim 1, wherein:
the network fabric is a Fibre Channel network; and
the plurality of fabric subsets comprises a plurality of zones.

5. A networking device, comprising:
a port operable to couple to a first networked device; and
a management module operable to:
within a network fabric, identify a plurality of fabric subsets, such that networked devices coupled to the network fabric that are included in a particular fabric subset of the plurality of fabric subsets are permitted to exchange information with each other;
identify a plurality of fabric subset configurations, such that each particular fabric subset configuration includes one or more fabric subsets of the plurality of fabric subsets that are active when the particular fabric subset configuration is active;
detect that the first networked device has become uncoupled from the port; and
in response to detecting that the first networked device has become uncoupled: modify the plurality of fabric subsets; and modify the plurality of fabric subset configurations;
wherein:
a first fabric subset includes the first networked device and a second networked device;
a first fabric subset configuration includes the first fabric subset and a third fabric subset; and
the management module is further operable to modify the plurality of fabric subsets such that a second fabric subset that does not include the first networked device and that includes the second networked device is created, and to modify the plurality of fabric subset configurations such that a second fabric subset configuration that does not include the first fabric subset and that includes the third fabric subset is created.

6. The networking device of claim 5, wherein the management module is further operable to modify the plurality of fabric subsets such that the first fabric subset does not include the first networked device.

7. The networking device of claim 5, wherein the management module is further operable to modify the plurality of fabric subsets such that such that the first fabric subset from among the plurality of fabric subsets is deleted.

8. The networking device of claim 5, wherein:
the network fabric is a Fibre Channel network; and
the plurality of fabric subsets comprises a plurality of zones.

18

9. A Fibre Channel switch, comprising:
a plurality of ports;
a plurality of zones, each zone comprising a subset of a plurality of devices operably coupled to the plurality of ports, each zone being operable to:
permit the subset of the plurality of devices associated with each particular zone to exchange information; and
restrict a remainder of the plurality of devices not associated with each particular zone from exchanging information with the subset of the plurality of devices associated each particular zone;
a plurality of configurations, each configuration comprising a subset of the plurality of zones, such that each particular configuration includes one or more zones that are active when the particular configuration is active; and
a management module operable to:
determine a particular device that is operably coupled to a particular port as being uncoupled from the particular port for longer than a predetermined amount of time;
automatically update the plurality of zones to restrict the particular device from exchanging information with other devices; and
automatically update the plurality of configurations.

10. The Fibre Channel switch of claim 9, wherein the management module is further operable to automatically update the plurality of zones such that each of the plurality of zones that includes the particular device among the subset of the plurality of devices no longer includes the particular device.

11. The Fibre Channel switch of claim 10, wherein the management module is operable to automatically update the plurality of zones such that, for each particular zone that includes only on of the plurality of devices, the management module is operable to delete the each particular zone.

12. The Fibre Channel switch of claim 9, wherein the management module is operable to automatically update the plurality of zones such that the management module is operable to make a copy of each of the plurality of zones that includes the particular device, except that the copy of the each of the plurality of zones does not include the particular device.

13. The Fibre Channel switch of claim 12, wherein the management module is further operable to automatically update the plurality of zones such that the management module is operable to delete the each of the plurality of zones that includes the particular device.

14. The Fibre Channel switch of claim 9, wherein the management module is operable to determine the particular device as being uncoupled from the particular port when the particular device has not been logged onto the Fibre Channel switch for a particular amount of time.

15. The method of claim 3, wherein:
a first fabric subset configuration includes the first fabric subset and a third fabric subset; and
modifying the plurality of fabric subset configurations comprises creating a second fabric subset configuration that does not include the first fabric subset and that includes the third fabric subset.

16. The method of claim 15, wherein modifying the plurality of fabric subset configurations further comprises deleting the first fabric subset configuration from among the plurality of fabric subset configurations.

* * * * *